United States Patent Office 2,946,996
Patented July 26, 1960

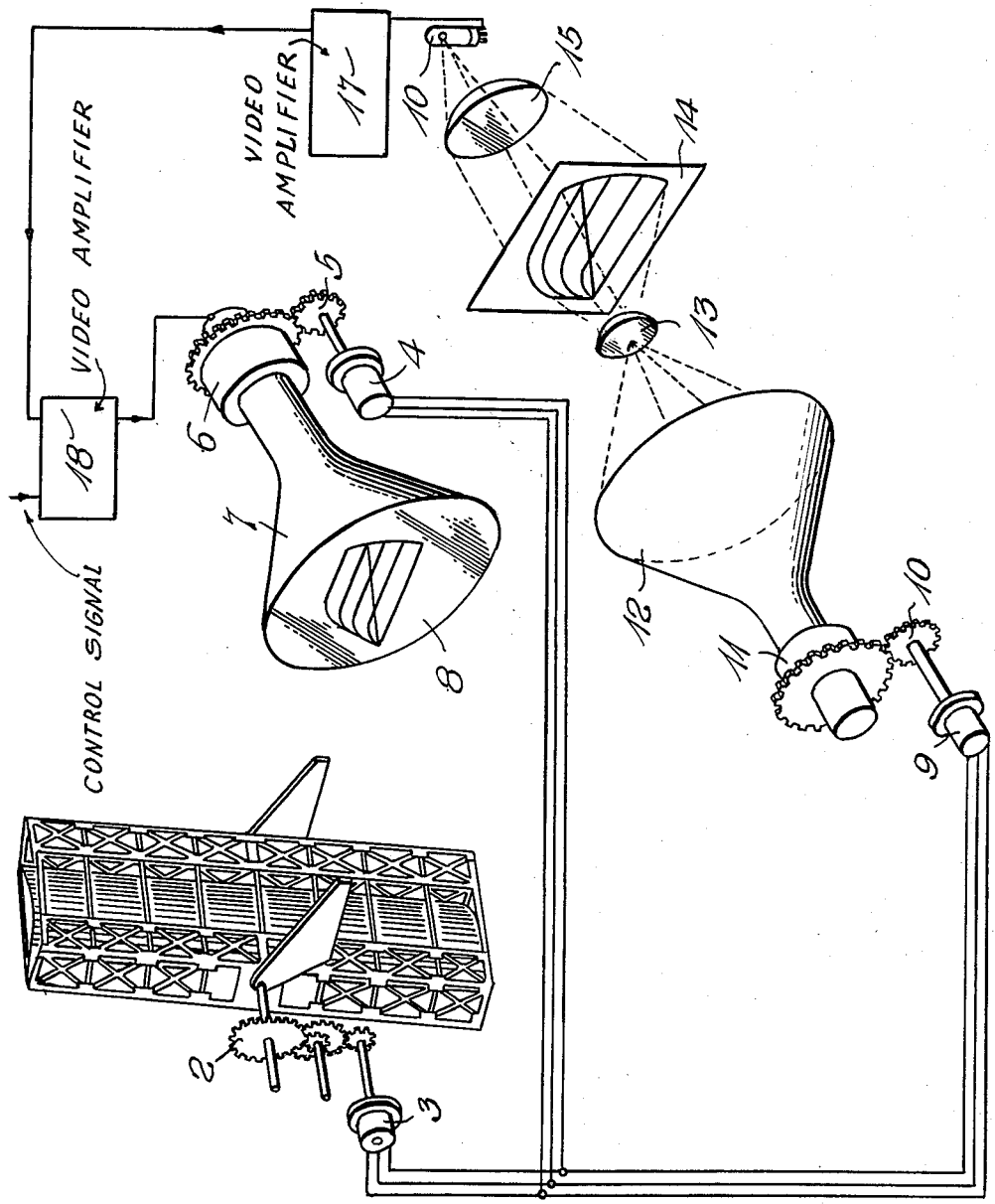

2,946,996

RADAR SYSTEMS

Harold Joseph Hughes Wassell, Danbury, England, assignor to Marconi's Wireless Telegraph Company Limited, London, England, a British company Original application Feb. 28, 1955, Ser. No. 491,135. Divided and this application Feb. 27, 1956, Ser. No. 568,062

Claims priority, application Great Britain Mar. 1, 1954

6 Claims. (Cl. 343—5)

This invention relates to height displaying radar systems.

This application is a division of application Serial Number 491,135, filed February 28, 1955, for Radar Systems and is my sole invention as distinguished from the sole invention of John Frederick James disclosed in said application 491,135 as it is now amended.

It is known in height displaying radar systems, to use a cathode ray display tube subjected to radial deflection by a time base so as to be a function of range and simultaneous circular deflection in dependence upon the angle of elevation with relation to the horizontal of an aerial whose elevation is varied so as to scan zenithally, the display being viewed through a mask consisting of constant height lines, each line being the locus of points whose relation between elevation and range corresponds to the same height.

Such a display arrangement has the inherent difficulty of poor discrimination and liability to errors, particularly as respects long range targets. Thus a distant target can change in height very substantially and produce only a small change in elevation with the result that there is an actual limitation in discrimination due to the finite size of the spot. This difficulty can, as is known, be avoided by providing electronic means for selecting a particular part of the total area looked at and expanding the display for that part but if this is done the same constant height line mask cannot be used, as was used for an unexpanded display.

The object of the invention is to provide a display arrangement in which the display can be expanded, off-set or otherwise specially presented as requisite without requiring more than one constant height mask.

According to this invention a height displaying radar system comprises a first cathode ray tube acting as a flying spot scanner, the cathode ray beam of the tube being arranged for linear deflection, a mask upon which is marked lines of constant height, the mask being arranged for scanning by said first tube, means for producing relative circular movement between the line produced by the linear deflection and said mask, in dependence upon the angle of elevation with respect to the horizontal of an aerial whose elevation is varied so as to scan zenithally, a second cathode ray tube acting as a display tube, the cathode ray beam of the latter tube being arranged to be subjected to simultaneous radial and circular deflection respectively dependent upon range and angle of elevation, and means for modulating the cathode ray beam in said second cathode ray tube, not only with signals derived from reflected target echoes but also with signals derived by the scanning of said mask by the first tube, the arrangement being such that when an electronic control is applied to select, or to magnify, or to off-set, any part of the display in the second tube, a corresponding modifying change will take place in the representation of the mask (or part thereof) produced in said second cathode ray tube.

For a better understanding of the invention and to show how the same will be carried into effect, reference will now be made to the following specification and the accompanying drawing, which schematically shows the invention.

Referring to the drawings in detail, reference character 1 designates a scanning aerial of the "nodding" type, that is to say it is moved in such a direction as to scan in the zenithal plane. The angular movement of the "nodding" aerial is imparted through step-up gear 2 to a selsyn motor 3 from which are driven two further selsyn motors indicated at 4 and 9. The selsyn motor 4 drives through a reduction gearing 5 a rotating deflection coil 6 of a normal height/range display tube 7. Radar echo signals are impressed upon the input of the video amplifier 18 and transmitted from the output thereof to the modulating electrode of the tube 7 and by this means received echoes are indicated in height and range on the display 8 in the normal manner.

The selsyn motor 9 which is driven from the selsyn motor 3 drives through a reduction gear 10, a rotary deflecting coil 11 associated with a cathode ray tube 12. The cathode ray tube 12 is the flying spot scanning tube of a video mapping unit, which unit further consists of condenser lens 13, a height lines slide 14, a further condenser lens 15 and photoelectric cell 16. The deflecting coil 11 is so driven from the "nodding" aerial through the reduction gear 2 and the selsyn motors 3 and 9 that the deflection of this coil 11 is proportional to the angular position of the aerial 1 in the zenithal plane relative to the horizontal. Simultaneously the electron beam in the tube 12 is deflected radially in a conventional manner. Means for doing this are well known practice and are, therefore, not shown. Thus the position of the scanning spot on the screen of video mapping tube 12 bears a direct relation to the angular movement of the "nodding" aerial with respect to the horizontal. As the flying spot scans over the video mapping tube 12 light emerges from its short afterglow screen. On the slide 14 are marked lines indicating constant height so that as this slide is scanned by the emergent light spot from the screen of the tube 12 the optical input to photo-electric cell 16 will be modulated by the constant height lines. Output from the photo-electric cell 16 is passed through a video amplifier 17 and thence to the video amplifier 18 of the normal height/range display tube.

It will be clear from the foregoing description that the height/range displaying tube 7 is also modulated with the output signal from the video mapping photo-electric cell 16, with the result that there will be superimposed on the normal height/range display on tube 7, the lines indicating constant height as shown on the display at 8. With such a type of display it is possible to expand, off-centre, or to otherwise move the P.P.I. picture and simultaneously the video height lines will move with the display.

The accuracy of the height line display is clearly dependent upon the accuracy of the correlation between the movement of the deflecting coil 11 and the zenithal angular movement of the aerial 1, and also on the correlation between the scan range and the height lines on the height lines slide 14. It will be noted with this system that the accuracy of the display is not dependent on the accuracy of the transmission of data to the height display tube 7 because the height calibration as provided by the video mapping unit will form a part of the actual display on tube 7 and consequently the height line calibration will be in error to the same extent as the video display itself.

It is important in carrying out this invention that the mechanical coupling between the aerial 1 and the deflection coils 11 of the video mapping tube 12 should be as close as possible so as to ensure the highest degree of accuracy. For the purpose of ensuring the maximum accuracy the tube 12 may be mounted in proximity with the aerial 1 and direct mechanical coupling employed between them.

In the embodiment shown in the drawing, a rotating coil equipment has been illustrated, the rotating coils (6 and 11) being driven by the selsyn motors 3, 4, 9. This, however, is by no means a necessary arrangement and there are distinct advantages, from the point of view of accuracy, in driving the coils 11 of the flying spot tube 12, mechanically. The advantages are of practical importance due to the stringent accuracy requirements of any height finder system using a nodding aerial, for 5 minutes of arc, in elevation, is equivalent to 800 feet at 100 nautical miles so that elevation should be known to better than 5 minutes of arc. It is, therefore, of practical advantage to dispense with the selsyn motors and mount the bulk of the equipment so that the coils can be driven directly through suitable gears from the nodding aerial.

Even, however, when every precaution is taken to ensure that the coils 11 follow the movements of the nodding aerial 1 with faithful precision there still remains a further difficulty. To be of value elevation must, of course, be known in relation to a horizontal reference plane and in the embodiments so far described elevation is only determined in relation to some portion of the aerial support structure. In practice, however, it is almost impossible to avoid some deflection of such a structure due to wind forces, or as it rotates in azimuth, so that it is almost impossible to obtain a true and constant horizontal reference plane by using a non-nodding part of the aerial structure to provide the same.

I claim:

1. A height displaying radar system comprising an aerial subject to scanning deflection in the zenithal plane, a first cathode ray tube, the cathode ray beam of the tube being subjected to linear deflection in dependence upon range, a mask marked with lines of constant height, the mask being subjected to scanning by the light spot of said first tube, said mask being maintained in fixed relationship with respect to the first cathode ray tube, means for subjecting the cathode ray beam of said first tube to a circular deflection in accordance with the angle of elevation of the aerial with respect to the horizontal and to the radial deflection coincident with a scanning deflection, a second cathode ray tube acting as a display tube, means for subjecting the cathode ray beam of the latter tube to simultaneous radial and circular deflection respectively in accordance with range and angle of elevation of the target echoes, and means for applying a control signal to said second tube, said means for subjecting the cathode ray beam of the latter tube including means for producing a display of the mask on said latter tube, said means for applying a control signal including means for expanding or off-setting the display of said latter tube.

2. A radar system as set forth in claim 1, in which deflection coils are provided for said first and second cathode ray tubes for producing said deflection and wherein drive means are provided for moving said deflection coils relative to their associated tube, in dependence upon the elevation of the aerial with respect to the horizontal, whereby the desired circular deflection is thereby attained.

3. A radar system as set forth in claim 1, in which deflection coils are provided for said first and second cathode ray tubes for producing said deflection and wherein a selsyn control system is provided as a drive for moving said deflection coils and wherein the aerial and the deflection coils of the first and second cathode ray tubes each have an associated selsyn unit, and control circuits extending from the unit associated with the aerial to the units associated with the deflection coils.

4. A radar system as set forth in claim 1, in which deflection coils are provided for said first and second cathode ray tubes for producing said deflection and wherein a mechanical coupling is provided as a drive between said aerial and the deflection coils associated with the first and second cathode ray tubes, whereby the deflection coils are moved in dependence upon the zenithal movement of the aerial.

5. A radar system as set forth in claim 1, wherein light produced by the beam of the first tube is applied via an optical system including said mask, to a photoelectric cell, whereby the output from cell is characteristic of the tube output after modulation by the constant height lines of the mask, and wherein the output of the cell is applied, via an amplifier, as modulation to the cathode ray beam of the second cathode ray tube.

6. A height displaying radar system comprising an aerial subject to scanning deflection in the zenithal plane, a first cathode ray tube, the cathode ray beam of the tube being subjected to linear scanning deflection, a mask marked with lines of constant height, the mask being subjected to scanning by the light spot of said first tube, said mask being movable in accordance with the angle of elevation of the aerial with respect to the horizontal, and wherein the cathode ray beam of the first tube is subjected to radial deflection only, whereby relative circular movement between the line produced by the linear deflection of said cathode ray beam and said mask is produced in accordance with the angle of elevation with respect to the horizontal of said aerial as said elevation thereof is varied so as to scan zenithally, a second cathode ray tube acting as a display tube, means for subjecting the cathode ray beam of said second tube to simultaneous radial and circular deflection respectively in accordance with range and angle of elevation of the target, means for modulating the cathode ray beam of said second tube with signals derived by the scanning of said mask by the first tube, and control signal means for selectively controlling the image produced on said second tube to modify the combined image of said second tube.

References Cited in the file of this patent

UNITED STATES PATENTS

| 2,522,528 | McNally | Sept. 19, 1950 |
| 2,523,328 | Ranks | Sept. 26, 1950 |
| 2,624,874 | Rines | Jan. 6, 1953 |
| 2,632,157 | Jones | Mar. 17, 1953 |
| 2,711,479 | Lewinter | June 21, 1955 |

FOREIGN PATENTS

| 622,098 | Great Britain | Apr. 27, 1949 |